May 22, 1962     G. R. OVERMAN ET AL     3,035,297

SQUEEGEE

Filed April 15, 1960

INVENTORS.
Guy R. Overman
Raymond C. Davis
BY
Their Attorney

United States Patent Office 3,035,297
Patented May 22, 1962

3,035,297
SQUEEGEE
Guy R. Overman and Raymond C. Davis, Dayton, Ohio, assignors to General Motors Corporation, Detroit, Mich., a corporation of Delaware
Filed Apr. 15, 1960, Ser. No. 22,604
8 Claims. (Cl. 15—250.36)

This invention relates to windshield wiper blades or squeegees and is particularly directed to a rubber blade having a low degree of frictional drag and to a method for making the same.

An object of the invention is to provide a windshield wiper blade or squeegee from rubber wherein the surface of the blade is chlorinated to a predetermined and critical extent and wherein the wiping edge is raw rubber.

In carrying out the above object, it is a further object to provide a method for making a blade of this character wherein dual blades are molded in edge-to-edge relation, are chlorinated and are then separated along the wiping edges thereof with a single cut which simultaneously exposes a raw rubber edge on each blade.

A further object of the invention is to provide an improved windshield wiper blade which has a low degree of frictional drag as compared with other blades of similar physical contours and formed from the same material.

Further objects and advantages of the present invention will be apparent from the following description, reference being had to the accompanying drawings wherein preferred embodiments of the present invention are clearly shown.

Figure 1:
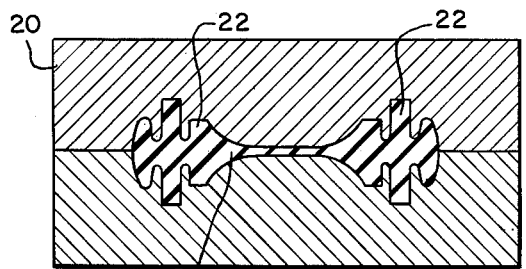
FIGURE 1 is a cross section of a mold for making the blades.

The requirements that must be met by a windshield wiper blade or squeegee have become increasingly demanding during the past few years due to the advent of the curved windshield used on most automobiles. This curved windshield is not only of greater extent than the old-fashioned flat windshield but, due to the compound curvatures thereon, it is necessary that a windshield wiper be provided which will perform progressively to the contours of the windshield as it passes thereover during the wiping operation. This means that the windshield wiper blade must be longer than those previously used and, also, may be attached to a flexible backing which will support and conform with the blade to the curvatures of the windshield. In order to cause this to occur, the backing for the blade is flexible and then pressure is applied to the backing intermediate the ends thereof to cause the backing and blade to conform to the several contours of the windshield during the wiping operation.

This increased length and increased pressure obviously increases the frictional drag of the blade across the windshield whereby the power required to move the windshield wiper blade across the windshield during the wiping operation is vastly increased. These factors have thus increased the stress applied to the windshield wiper motor and have created numerous difficulties necessitating more powerful motors in order to obtain uniform wiping speed under all conditions.

It is apparent that, if the frictional drag between the rubber and the glass can be reduced, the assembly will require less power to operate and, likewise, will improve the wiping action since, as the drag increases, there is a tendency toward chattering of the blade as it is pulled over the glass which sometimes results in a streaked windshield during the wiping cycle. Thus, a blade which does not grab and which has a lower degree of frictional drag than a conventional blade moves over the glass with less effort and wipes the windshield more uniformly and without streaks. Furthermore, as the frictional drag is reduced, the possibility of damage to the windshield is greatly reduced.

Windshield wiper blades of the general type discussed herein are shown in Wallis Patent 2,901,761. It is also to be understood that, in place of the rubber windshield wiper element shown in this patent, the element may be of the replaceable type which is releasably held by the backing so that the whole element can be easily removed and replaced if desired. In other words, the present invention is directed specifically to the wiping element per se and not the blade assembly including the wiping element.

We have found that windshield wiper blades or squeegees made from a high grade, crepe rubber provides the greatest resiliency and life and that, if these blades are chlorinated at the surfaces thereof, the wear of the blade is greatly reduced. We have also found that the frictional drag of the blade against the windshield is greatly reduced when the chlorinated surface of the wiping element is used in cooperation with a raw rubber edge.

We have found that a fully chlorinated blade appears to streak the windshield. This is believed due to incipient surface cracks in the very thin edge portion caused by chlorination. By using a raw rubber edge, these cracks are eliminated and the wiping action is improved. Chlorination, on the other hand, reduces friction providing the surface is free from cracks. Comparative tests show that elements made in accordance with the present invention consistently exhibit between 20% to 30% less frictional drag under identical wiping conditions as compared to identical unchlorinated rubber blades or blades having a fully chlorinated surface including the chlorinated edge.

Furthermore, the raw rubber edge, due to its greater frictional drag, causes improved and quicker reversal of the blade at the end of each wiping stroke. This generally improves the wiping action and actually reduces the power required to turn the blade while maintaining a more constant power requirement.

The blades, as described in this specification, may be made by any suitable method, for example, by extrusion or molding, although we prefer to mold the blades due to the rather critical nature of the dimensions thereof. This is preferably accomplished in a multiple mold shown in FIGURE 1 in cross section at 20 wherein two identical blades 22 are molded simultaneously in edge-to-edge relation to form an integral piece 26. The mold 20 may be of a multiple length, that is, the mold 20 may be one blade long or twelve blades long, etc., as desired wherein the blades may be cut subsequently transversely of the strip if a multiple length is used.

Figure 2:
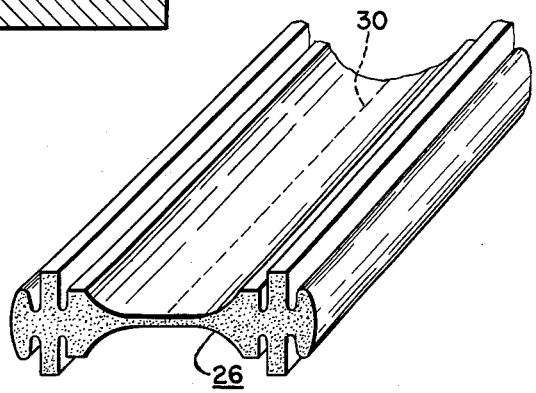
FIGURE 2 is a view, in perspective, of the molded blades prior to cutting or separation thereof.

The compound blade structure 26, as it comes from the mold, is shown in perspective in FIGURE 2. This blade structure 26 is then chlorinated under controlled conditions as explained hereinafter whereupon the two blades are severed along the line intermediate the longitudinal edges thereof, designated by dotted lines at 30, to form a raw rubber edge 38 on each blade.

Figure 3:
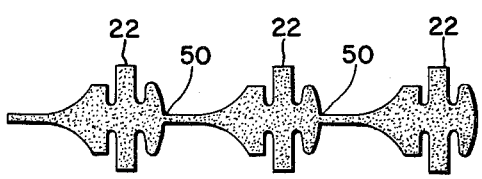
FIGURE 3 shows another form of molding.
Figure 4:
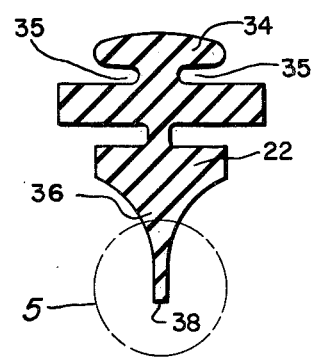
FIGURE 4 is a cross-sectional view of a typical blade.
Figure 5:
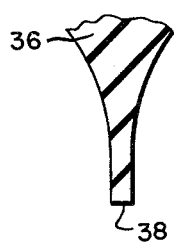
FIGURE 5 is an enlarged cross-sectional view of the wiping portion of said blade.

Another way to mold the blades is in transverse multiples as shown in FIGURE 3. In this case, the blades are severed after chlorination at the wiping edge noted at 50. Here again, the wiping blade has a chlorinated surface except at the wiping edge which is raw rubber. This and other obvious methods of making multiple moldings may be used if desired in place of the previously-described method.

The severing or cutting of the edge in all cases may be done by any one of a number of known means, such as by a rotating slitter, a razor-sharp slitter or a fast-acting shear blade which operates on all portions of the edge simultaneously. In this case, the speed of cutting is important and should be sufficiently fast to prevent distortion of the edge.

In some cases, it may be desirable to freeze the rubber prior to cutting to obtain an absolutely square cut by means of a shear blade, all of these various means of severing being well known in the art.

Each blade 22 includes a relatively heavy base section 34 preferably provided with longitudinally extending notches or grooves 35 at opposite sides thereof to facilitate attachment to the metal carrier (not shown). The blade portion 36 extends outwardly from the base 34 and tapers inwardly therefrom at each side thereof to form a thin edge 38. The surface of the edge 38 is raw rubber.

An exemplary compound suitable for the manufacture of windshield wiper blades is as follows:

|  | Parts |
| --- | --- |
| Master batch (see below) | 122.20 |
| N-cyclohexyl 2 benzothiazole sulfenamine (accelerator) | .65 |
| Tetramethyl thiuram disulfide (accelerator) | .16 |
| Sulfur (predispersed) | 2.05 |
| Dialkyl substituted paraphenylene diamine | 1.15 |
| Total | 126.21 |

The recipe for the master batch is formulated as follows:

|  | Parts |
| --- | --- |
| Washed and dried latex crepe rubber #1 grade | 61.5 |
| 2 naphthalenethiol plasticizer | .20 |
| Zinc oxide (zinc-propionate coated) | 6.00 |
| Carbon black (fine thermal grade—4.1 acres per pound) | 30.50 |
| Stearic acid | .40 |
| Symmetrical dibetanaphthyl paraphenylene diamine (antioxidant) | .70 |
| Petroleum oil (softener) | .70 |
| Total | 100.00 |

The master batch is first mixed together in an internal mixer of the Banbury type at 200° F. to 225° F. for about 10 minutes, and is sheeted out on a mill into a one-eighth inch thick sheet. The sheet is then extruded through a screen to remove any foreign particles. This screened material is again sheeted and stored. This sheet is next added to the other ingredients on a mill to obtain a homogeneous dispersion of materials. All mills are water cooled and maximum temperatures are held below 200° F., preferably 195° F. Weighed slugs of this material are placed in a properly treated mold and are compression molded at 287° F. for 10 minutes. Mold treatment comprises a light coat of mold lubricant, for example, a spray of liquid soap or the like.

The above recipe yields a resilient age-resistant rubber material of very high quality. It is apparent that deviations in the formulation may be made as are well known in the art and that various substitute materials may be used for the accelerators, antioxidants, etc. The specific formulation of the compound forms no part of this invention since other natural rubber compounds having similar physical properties may be used with complete satisfaction.

After the parts are molded, they are chlorinated and this particular point is one of great importance to the success of the invention. Chlorination of the sheets of molded rubber material is carried out in a rubberized tank wherein the molded sheets are immersed in water having chlorine gas therein in a concentration of 2 to 4 grams per liter. This concentration is maintained in the chlorination tank by bubbling chlorine gas directly into the solution. The extent of chlorination is determined by the time of immersion and the concentration of chlorine in the water together with the temperature of the water. For the above concentration range, an immersion time varying between 4 and 2 minutes respectively generally yields satisfactory chlorination. We prefer to carry out the operation at room temperature without attempting to maintain the vat at any constant temperature since we have found that it is vitally necessary to check the extent of chlorination. This may be done by X-ray fluorescence and the measurement of the chlorine K alpha emission line which appears at 113.97° 2 theta using a sodium chloride crystal as the analyzing crystal. Instrument settings for the device, when when using a Norelco X-ray fluorescence spectrograph using a helium path with a Geiger detector, are as follows:

K.V. 50, M.A. 40
Detector 930 V. Thin window Geiger
Scaler—Neg.
Operation—Continuous
Rate meter—Scale factor 32 and 8
Multiplier—1.0
Time constant—4 seconds
Molybdenum target tube The external standard is a single crystal of sodium chloride wherein the crystal completely fills the sample area. With the instrument settings on the aforementioned Norelco spectrograph, the sodium chloride crystal yields a reading of 824 counts per second.

The surface of the blade to be analyzed is presented as a 23×35 millimeter flat surface in the sample holder and is exposed to the X-ray beam. The K alpha count per second should range between 180 to 260 with 200 to 240 being preferred to yield the desired wipability in the finished blade as compared with 824 counts per second for the sodium chloride standard.

It is apparent that comparable readings may be established on any X-ray fluorescence spectrograph with Geiger detector that is equipped to determine the chlorine K alpha emission line by determining the counts per second for a sodium chloride crystal and establishing a factor which may be used as a multiplier for the desired reading on the rubber surface.

For example, if a reading of 1050 is obtained for sodium chloride, the proper K alpha count per second range for the rubber chlorination will be established by multiplying the 180 to 260 range limits by a factor of $$\frac{1050}{824}$$

or 1.27 which yields range limits of from 228 to 340 counts per second, as compared with a 1050 count per second reading on sodium chloride, etc. Control of the extent of chlorination is highly important since too highly chlorinated rubber tends to become stiff and tends to crack while too lightly chlorinated rubber does not meet the reduced drag figures desired.

After the desired extent of chlorination is obtained, the blades are trimmed as above-noted by cutting them longitudinally at the thinnest section to yield an exposed edge of raw rubber. In this connection, therefore, it is to be understood that the extent of chlorination and the combination of a chlorinated surface and a raw edge at the wiping edge forms the basis for the present invention wherein considerably less drag, in the order of 30% (within the preferred range) and about 25% over the entire range, is obtained over similar blades made from similar compounds and tested under identical conditions as above-noted wherein said similar blades have fully chlorinated surfaces or fully unchlorinated surfaces. These figures are obtained by measurement of power required to oscillate the blades at identical rates under identical conditions.

After trimming, the blades are washed thoroughly to eliminate any residual mold coating material thereon which would cause initial smearing of the windshield and, after air drying, are ready for use.

The invention set forth herein may be used in all types and designs of blades using varying types of supports. For example, the invention may be used in connection with the blades disclosed in Patents 2,920,335, 2,888,702, 2,634,446, 2,651,800, etc., and Serial No. 829,250, assigned to the assignee of the present invention.

While the embodiments of the present invention as herein disclosed constitute preferred forms, it is to be understood that other forms might be adopted.

What is claimed is as follows:

1. A squeegee, comprising, a cured natural rubber base having a chlorinated surface thereon, and a raw rubber wiping edge, the extent of chlorination being measurable by X-ray fluorescence spectrography wherein the chlorine K alpha count per second ranges between 180 and 260 as compared to an 824 count per second for sodium chloride.

2. A windshield wiper blade, comprising, an elongated natural rubber part including a relatively heavy backing portion tapering outwardly thereof to a relatively thin longitudinally extending wiping edge wherein all working parts of said blade have a chlorinated surface thereon except for said edge which is raw rubber, the extent of chlorination being measurable by X-ray fluorescence spectrography wherein the chlorine K alpha count per second ranges between 180 and 260 as compared to an 824 count per second for sodium chloride.

3. In a method of making squeegees, having a low degree of frictional drag when rubbed over a glass surface, comprising the steps of; molding a squeegee from a natural rubber compound, curing the compound in the molded part, chlorinating the entire part, wherein the extent of chlorination is measured by X-ray fluorescence spectrography and wherein the chlorine K alpha count per second ranges between 180 and 260 as compared to an 824 count per second for sodium chloride, and then trimming one edge thereof to expose raw rubber therealong.

4. A squeegee, comprising, a cured natural rubber base having a chlorinated surface thereon, and a raw rubber wiping edge, the extent of chlorination being measurable by X-ray fluorescence spectrography wherein the chlorine K alpha count per second ranges between 200 to 240 as compared to an 824 count per second for sodium chloride.

5. A windshield wiper blade, comprising, an elongated natural rubber part including a relatively heavy backing portion tapering outwardly thereof to a relatively thin longitudinally extending wiping edge wherein all working parts of said blade have a chlorinated surface thereon except for said edge which is raw rubber, the extent of chlorination being measurable by X-ray fluorescence spectrography wherein the chlorine K alpha count per second ranges between 200 to 240 as compared to an 824 count per second for sodium chloride.

6. In a method of making squeegees, having a low degree of frictional drag when rubbed over a glass surface, comprising the steps of; molding a squeegee from a natural rubber compound, curing the compound in the molded part, chlorinating the entire part wherein the extent of chlorination is measured by X-ray fluorescence spectrography and wherein the chlorine K alpha count per second ranges between 200 to 240 as compared to an 824 count per second for sodium chloride, and then trimming one edge thereof to expose raw rubber therealong.

7. In a method for making a windshield wiper blade, the steps comprising; molding two windshield wiper blades as a single part wherein each blade consists of a heavy backing portion and a relatively thin wiping edge wherein the thin wiping edges are joined longitudinally thereof, curing the molded compound to produce a dual blade, chlorinating the dual blade to produce a chlorinated rubber compound all over the surface thereof wherein the extent of chlorination is measured by X-ray fluorescence spectrography and wherein the chlorine K alpha count per second ranges between 180 and 260 as compared to an 824 count per second for sodium chloride, and thereafter severing the dual blade through the middle of the wiping portions thereof for creating two separate blades having raw rubber edges thereon.

8. In a method for making a windshield wiper blade, the steps comprising: molding two windshield wiper blades as a single part wherein each blade consists of a heavy backing portion and a relatively thin wiping edge wherein the thin wiping edges are joined longitudinally thereof, curing the molded compound to produce a dual blade, chlorinating the dual blade to produce a chlorinated rubber compound all over the surface thereof wherein the extent of chlorination is measured by X-ray fluorescence spectrography and wherein the chlorine K alpha count per second ranges between 200 and 240 as compared to an 824 count per second for sodium chloride, and thereafter severing the dual blade through the middle of the wiping portions thereof for creating two separate blades having raw rubber edges thereon.

References Cited in the file of this patent

UNITED STATES PATENTS

| | | |
|---|---|---|
| 1,888,843 | Anderson | Nov. 22, 1932 |
| 2,679,065 | Nesson | May 25, 1954 |
| 2,947,871 | Friedman | Aug. 2, 1960 |
| 2,952,865 | Rohr et al. | Sept. 20, 1960 |